2 Sheets—Sheet 2.
W. C. HERIDER.
BLACKBOARD AND MAP CASE.
No. 40,035. Patented Sept. 22, 1863.
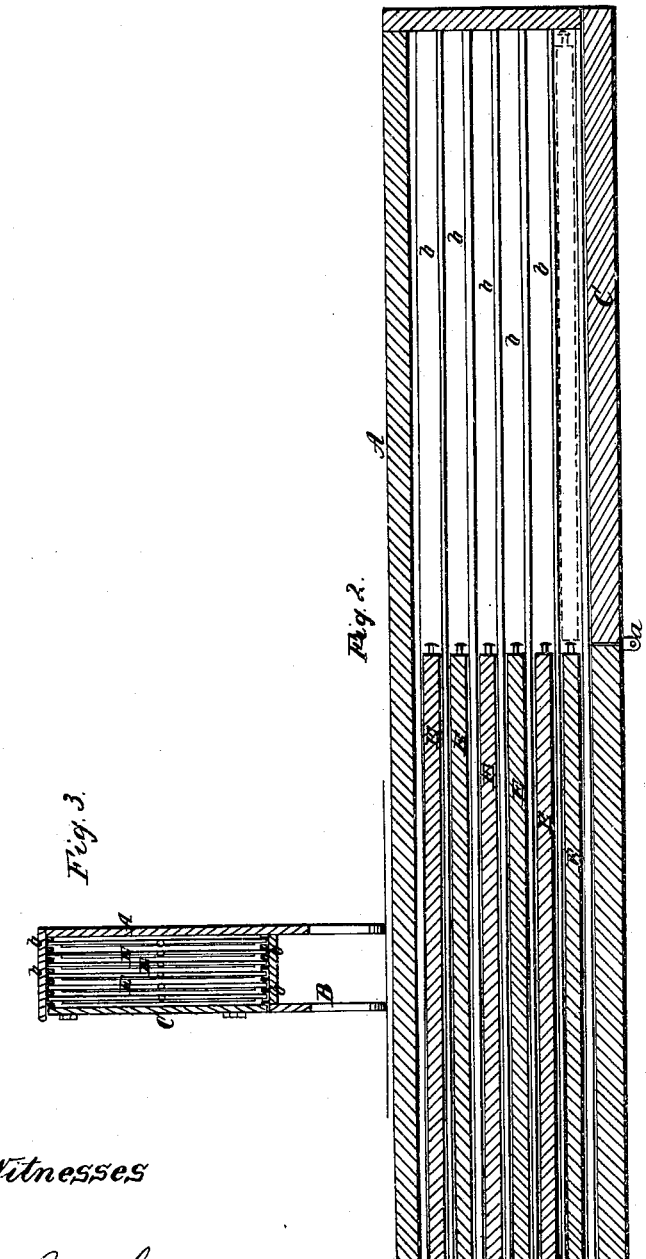
Witnesses
Inventor

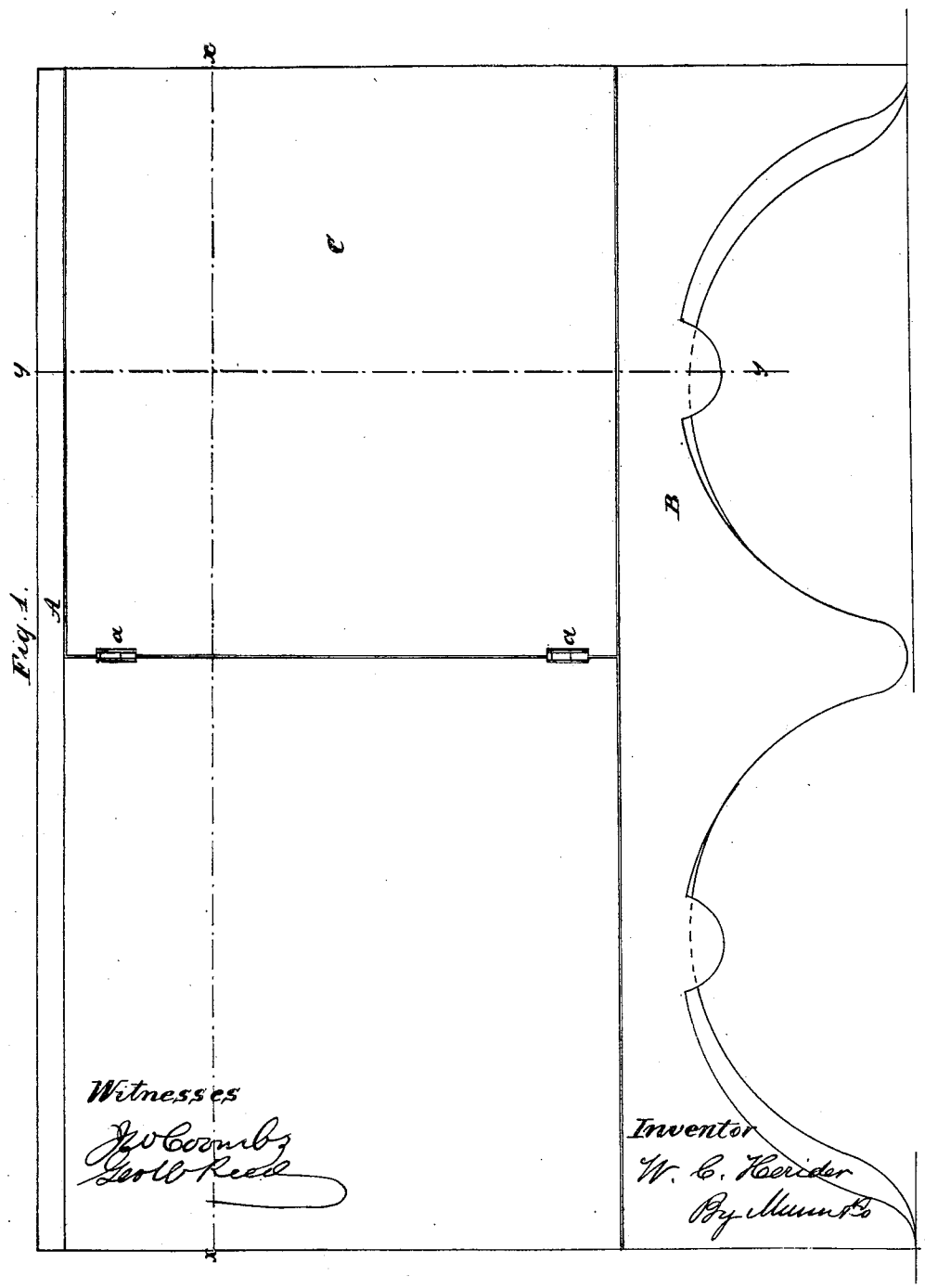

UNITED STATES PATENT OFFICE.

WILLIAM C. HERIDER, OF MIAMI TOWN, OHIO

BLACKBOARD AND MAP-CASE.

Specification forming part of Letters Patent No. 40,035, dated September 22, 1863.

*To all whom it may concern:*

Be it known that I, WILLIAM C. HERIDER, of Miami Town, in the county of Hamilton and State of Ohio, have invented a new and useful Combination of a Blackboard and Map-Case; and I do hereby declare that the following is a full, clear, and exact description of the same, reference being had to the accompanying drawings, making a part of this specification, in which—

Figure 1 is a front elevation of my invent'on; Fig. 2, a horizontal section of the same, taken in the line $x$ $x$, Fig. 1; Fig. 3, a reduced transverse vertical section of the same, taken in the line $y$ $y$, Fig. 1.

Similar letters of reference indicate corresponding parts in the several figures.

This invention consists in the employment or use of a case constructed of rectangular form, and having a door at its front side, which may comprise one-half the length of the front of the case, the door being hung upon hinges or arranged so as to slide, and the whole of the front of the case being painted black so as to serve as a blackboard, while the interior of the case at its top and bottom is provided with guides or grooves in which frames or slides are fitted and on which maps are secured, the frames being equal in height to the interior of the case and equal in length to one-half the length of the case, all being so arranged that when the devices is not used as a blackboard the door may be opened and any one of the frames or slides shoved back into the part of the case at one side of the door so that any one of the maps in the open part of the case may be exposed.

To enable those skilled in the art to fully understand and construct my invention, I will proceed to describe it.

A represents a rectangular case of any suitable dimensions, and supported by any suitable base, B. The front of this case is provided with a door, C, the length of which is equal to half the length of the case, and is hung upon hinges $a$. The front of this case, including the door, is painted black at its outer side, so that when said door is closed the front of the case serves as a blackboard. The interior of the case, both at its top and bottom, is provided with guides or grooves $b$, which are made in the inner surfaces of the top and bottom of the case, the grooves being parallel with each other, and those in the upper block being in the same planes with those in the lower block, as shown clearly in Fig. 3. Any number of these grooves or guides may be used, according to the depth of the case. In these guides or grooves $b$ there are fitted rectangular frames or slides E, the height of which is equal to that of the case, the length of the frames or slides being equal to half the length of the case, as shown clearly in Fig. 2. The frames or slides E are allowed to slide freely in the guides or grooves $b$, and when shoved to the left they may all be inclosed within the part of the case to the left of the door C, as shown in Fig. 2, and when shoved to the right the extent of their movement the whole surface of the outermost frame or slide will, when the door C is open, be fully exposed. Hence it will be seen that if all the frames or slides E be shoved to the right, and the door C open, that the several frames or slides may be consecutively exposed by shoving the outermost ones to the left. On these frames or slides E the maps are pasted or otherwise secured. Thus it will be seen that a very convenient combination of a blackboard and map case is obtained for schools. The case may be of sufficient dimensions to receive a complete set of maps—as, for instance, Mitchell's Outline Maps, ten in number, each being exposed consecutively. By this arrangement the maps may be preserved in perfect order, and when not in use are securely inclosed within the case beyond the reach of injury.

Having thus described my invention, I claim as new, and desire to secure by Letters Patent, as an improved article of manufacture—

A combined blackboard and map-case, substantially as herein shown and described.

WM. C. HERIDER.

Witnesses:
A. E. WEST,
GEO. SNYDER.